United States Patent
Myers

(10) Patent No.: US 6,592,452 B1
(45) Date of Patent: Jul. 15, 2003

(54) HOOK FOR SAUSAGE CONVEYOR

(75) Inventor: James Linden Myers, Urbandale, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/628,606

(22) Filed: Jul. 31, 2000

(51) Int. Cl.⁷ ............................................... A22C 11/00
(52) U.S. Cl. ........................................................ 457/51
(58) Field of Search ........................... 452/51, 46, 187, 452/186

(56) References Cited

U.S. PATENT DOCUMENTS

| | | | |
|---|---|---|---|
| 3,312,442 A | 4/1967 | Moeller | 248/217 |
| 3,347,504 A | 10/1967 | Goss | 248/488 |
| 3,423,058 A | 1/1969 | Kuster | 248/301 |
| 3,972,499 A | 8/1976 | Simmons | 248/224 |
| 4,218,003 A * | 8/1980 | Plewa et al. | 452/51 |
| 5,163,864 A * | 11/1992 | Burger et al. | 452/51 |
| 5,354,229 A * | 10/1994 | Markwardt et al. | 452/51 |
| D397,287 S | 8/1998 | Hergott et al. | D8/367 |

* cited by examiner

*Primary Examiner*—Thomas Price

(57) ABSTRACT

A sausage conveyor hook has an elongated support arm having first and second ends and first and second arm portions disposed at an angle with respect to each other. The first arm portion normally is disposed in a horizontal position on the conveyor, and the second arm portion extends downwardly and outwardly from the first arm portion. The support arm extends outwardly from the conveyor chain at a right angle. The support arm has forwardly and rearwardly side edges. A pair of spaced hook elements extend forwardly from the second arm portion. When a strand of linked sausages comprised of a plurality of sausage links separated by link points is draped over the uppermost of the hook elements, the strand will bend on the pivotal link point proximate the upper hook element. The sausage links adjacent the bent link point will be held in an angular position with respect to each other by the relative positions and arm portions and the hook elements. Further, the center axes of adjacent sausage links draped across the upper hook element will be in substantially the same vertical plane, and will dwell in a plane that is diagonally disposed with respect to the forward edge of the support arm.

6 Claims, 7 Drawing Sheets

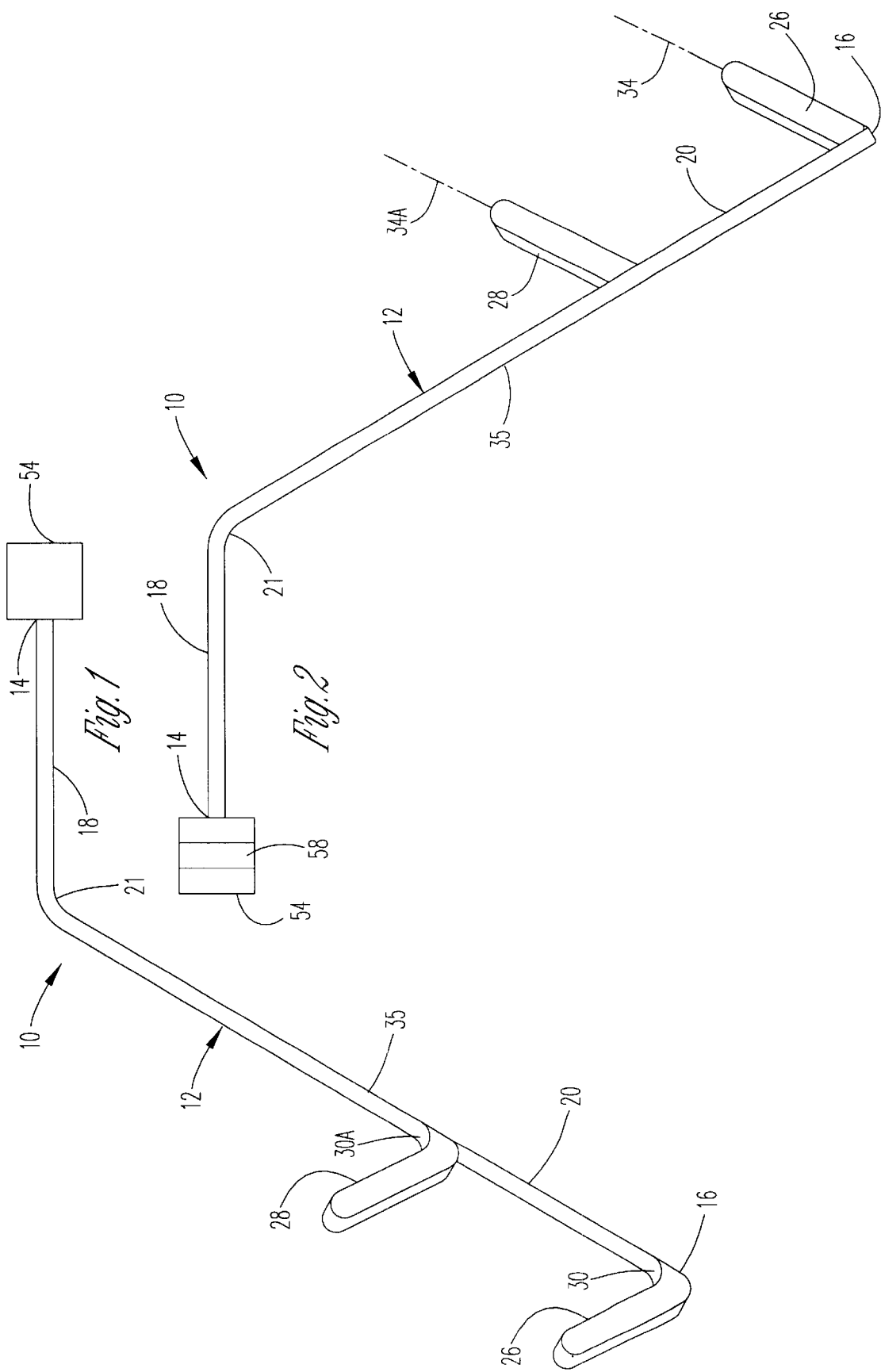

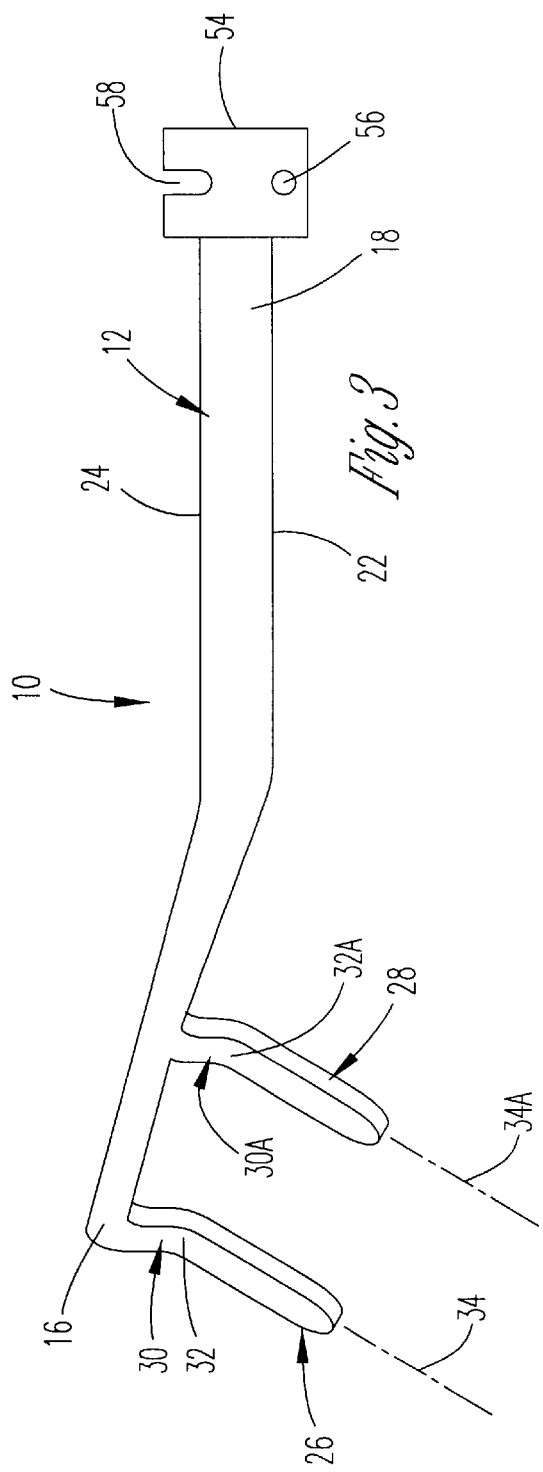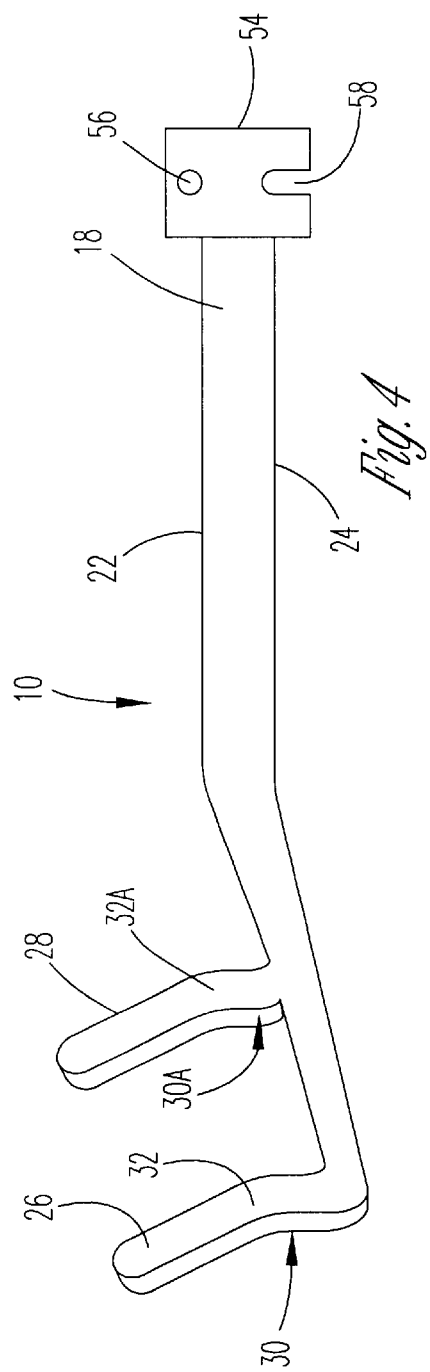

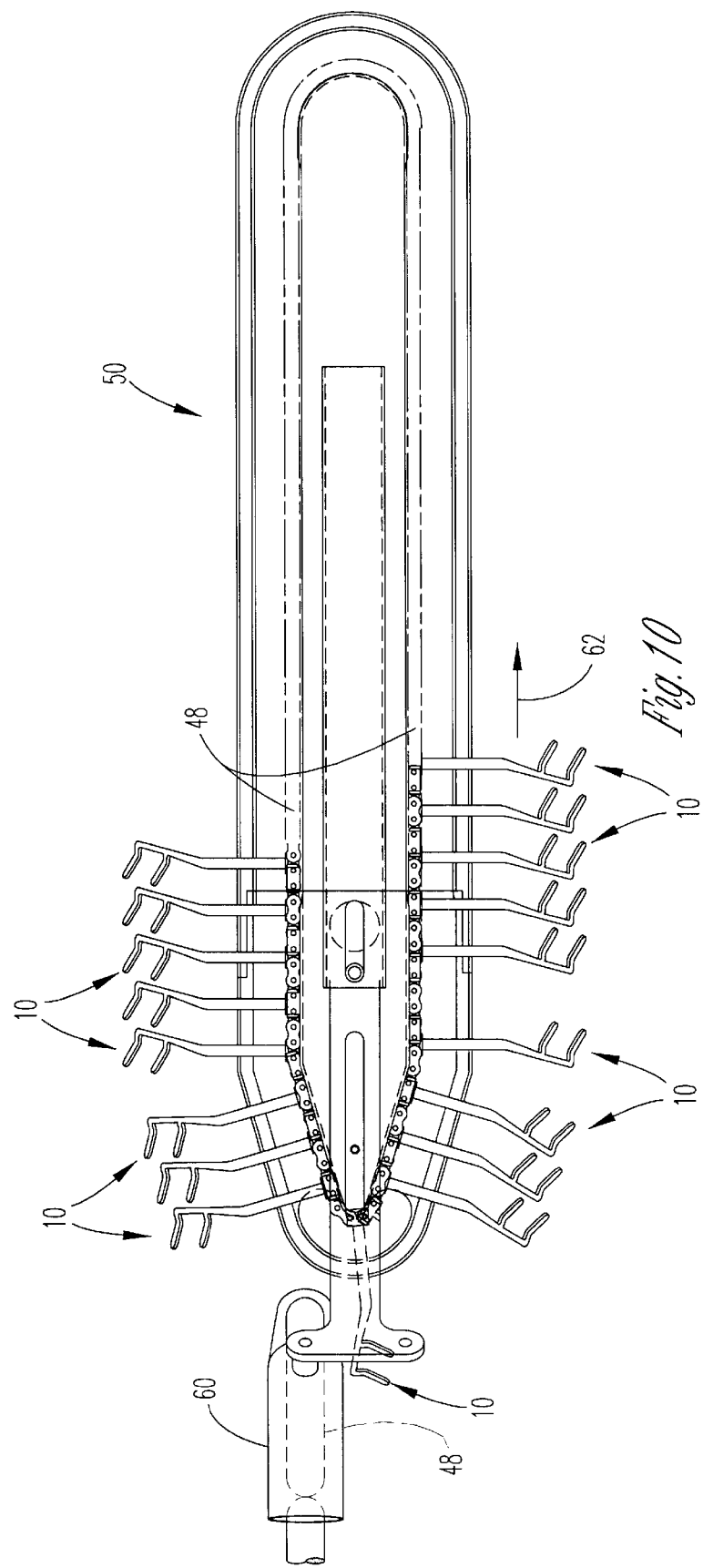

HOOK FOR SAUSAGE CONVEYOR

BACKGROUND OF THE INVENTION

Sausage making machines of the type long known in the industry (U.S. Pat. Nos. 3,191,222 and 3,115,668) are often accompanied by a conveyor which holds the strand of linked sausages in circular loops, each supported by a hook on the conveyor. The loops are then manually removed from the conveyor by use of an elongated "stick" wherein the stick is inserted through a plurality of loops, and then lifted from the hooks which support the loops. This is a difficult job which requires threading the stick through the loops of sausages which often are swinging on the hook. Removing the strands from the conveyor after they have been threaded onto the stick is also difficult, because the shape of the hooks does not easily release the loops, and because the hooks do not hold the loops in an open configuration.

The sticks, when filled with the loops of sausages, are then manually loaded onto a carrier or robotically loaded into a cooking or smoking device.

In addition, conventional wire hooks on sausage conveyors do not allow for the operator to easily insert the stick because the loop opening faces the operator of the sausage making machine, and the stick must be inserted from an opposite and more difficult direction. Further, much valuable time is consumed by removing a strand of linked material with the stick by conventional methods, and this slows down the overall progress of the sausage making machine. In the case of cellulose casings, they often become entangled upon being placed upon the conventional conveyors. They become twisted, and the loops form a figure eight shape which is not conducive to removal by the sticks.

It is therefore a principal object of this invention to provide a sausage conveyor hook which will spread the sausage links apart at the top of the loop to allow the person who is using the stick to remove the loop from the hooks by sliding it easily through the loops without having to slide the stick through loops of a tangled configuration.

A further object of the invention is to provide a sausage conveyor hook which will easily release the loops from the hooks.

A still further object of this invention is to provide a sausage conveyor hook which disposes the loops in a diagonal configuration with respect to the conveyor so as to permit the ease of insertion of a stick into the adjacent loops of sausages from a downstream direction.

A still further object of the invention is to provide a sausage conveyor hook which will allow the conveyor to drive the loops right upon the stick when the stick is held in a stationary position while the conveyor is moving the loops on to the stick.

A still further object of the invention is to provide a sausage conveyor hook that will easily accommodate cellulose casings as well as natural casings.

These and other objects will be apparent to those skilled in the art.

SUMMARY OF THE INVENTION

A sausage conveyor hook has an elongated support arm having first and second ends and first and second arm portions disposed at an angle with respect to each other. The first arm portion normally is disposed in a horizontal position on the conveyor, and the second arm portion extends downwardly and outwardly from the first arm portion. The support arm extends outwardly from the conveyor chain at a right angle. The support arm has forwardly and rearwardly side edges.

A pair of spaced hook elements extend forwardly from the second arm portion. When a strand of linked sausages comprised of a plurality of sausage links separated by link points is draped over the uppermost of the hook elements, the strand will bend on the pivotal link point proximate the upper hook element. The sausage links adjacent the bent link point will be held in an angular position with respect to each other by the relative positions and arm portions and the hook elements.

Further, the center axes of adjacent sausage links draped across the upper hook element will be in substantially the same vertical plane, and will dwell in a plane that is diagonally disposed with respect to the forward edge of the support arm.

BRIEF DESCRIPTION OF THE DRAWINGS

FIG. 1 is a forward elevational view of the conveyor hook of this invention;

FIG. 2 is a rearward elevational view thereof;

FIG. 3 is a top plan view thereof;

FIG. 4 is a bottom plan view thereof;

FIG. 10 is a plan view of the conveyor hooks of this invention mounted on an actual conveyor.

DESCRIPTION OF PREFERRED EMBODIMENT

Figure 6:
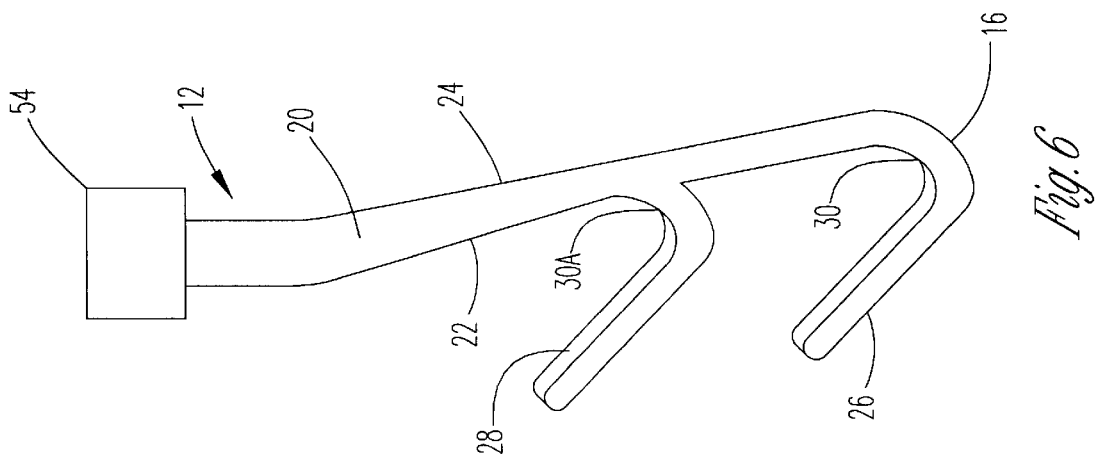
FIG. 6 is an inner side elevational view opposite to that of FIG. 5.
Figure 5:
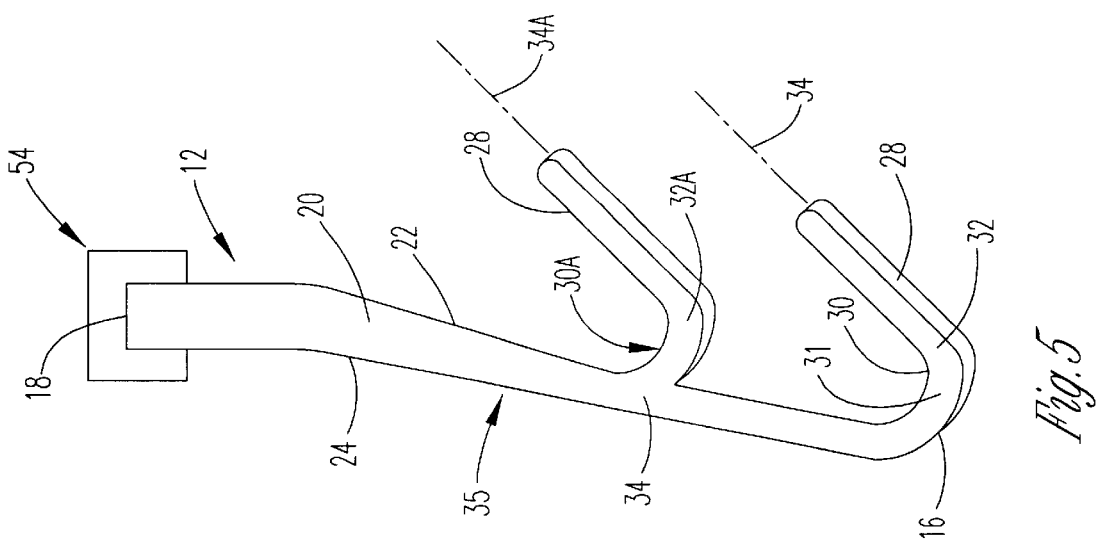
FIG. 5 is an outer side elevational view thereof as viewed from one side of the elongated conveyor chain or the other.

With reference to FIGS. 1 through 6, the conveyor hook 10 has a support arm 12 which has a first end 14 and a second end 16. The support arm has a first arm portion 18 adjacent end 14 and a second arm portion 20 adjacent second end 16. The support arm is bent at 21 to dispose the first and second arm portions in an angular relation of approximately 45 degrees. As best shown in FIGS. 3 and 4, the arm portion 18 has a substantially straight forward edge 22 and a substantially straight rearward edge 24. The support arm 12 is preferably stamped from a sheet of metallic material approximately ⅛th of an inch thick and has a flat configuration and is not round in cross section as are most conventional hooks.

The second arm portion 20 terminates in a lower hook element 26 which is connected to the arm portion 20 by an arcuate cradle portion 30. Hook element 26 is connected to cradle portion 30 at bend point 32 (FIGS. 3–6). Hook element 26 has an elongated center axis 34. A second and upper hook element 28 is connected to arm portion 20 at the center portion 35 thereof by cradle portion 30A. Hook element 28 has an elongated center axes 34A parallel to axis 34 of hook element 28. The hook element 26 is connected to cradle portion 30A at bend point 32A. The hook elements 26 and 28 are substantially identical in shape and extend outwardly and upwardly and forwardly from arm portion 20.

Figure 7:
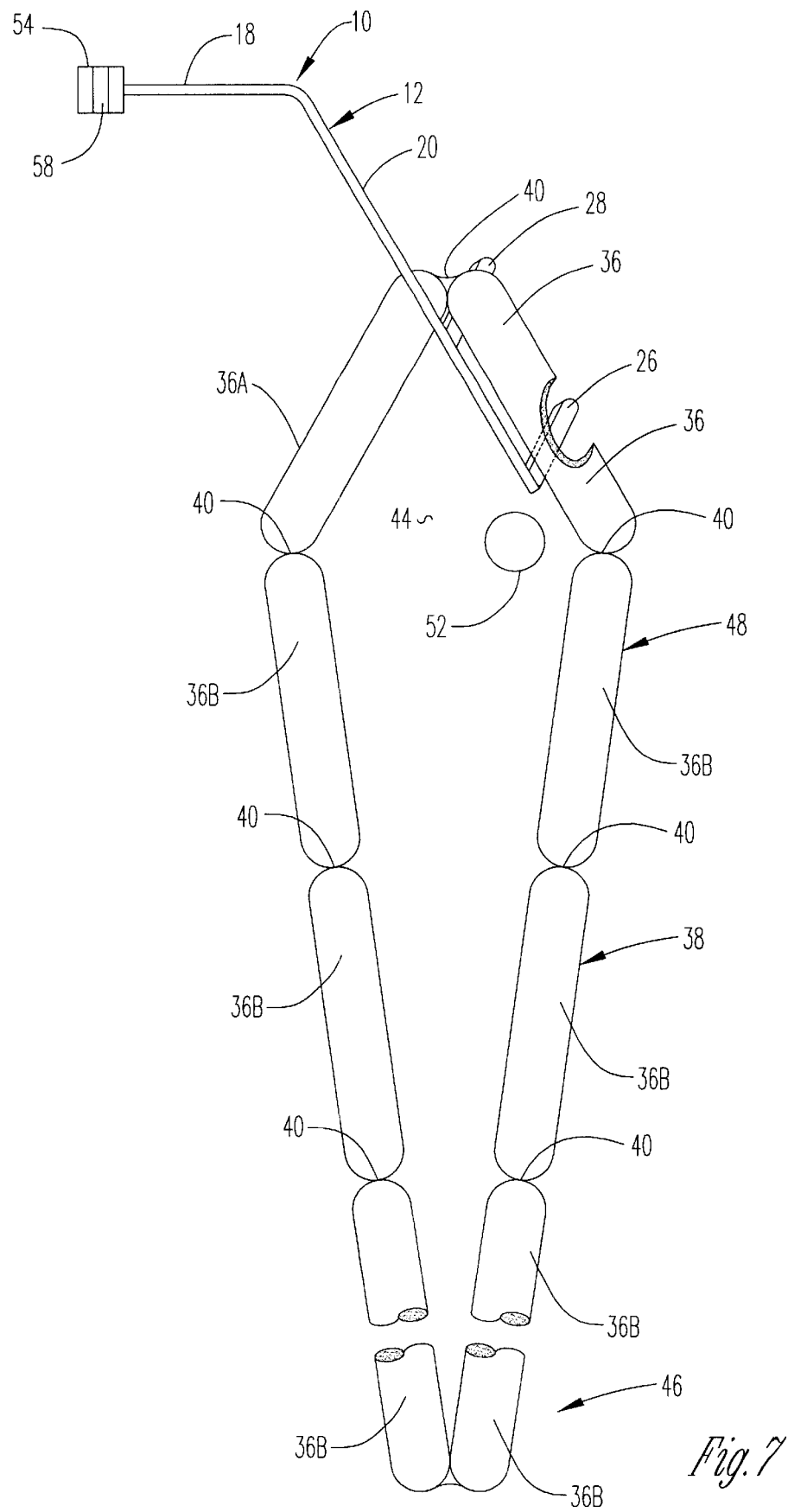
FIG. 7 is an enlarged scale rear elevational view of a loop of linked sausages supported on a conveyor hook as seen on line 7–7 of FIG. 9.
Figure 8:
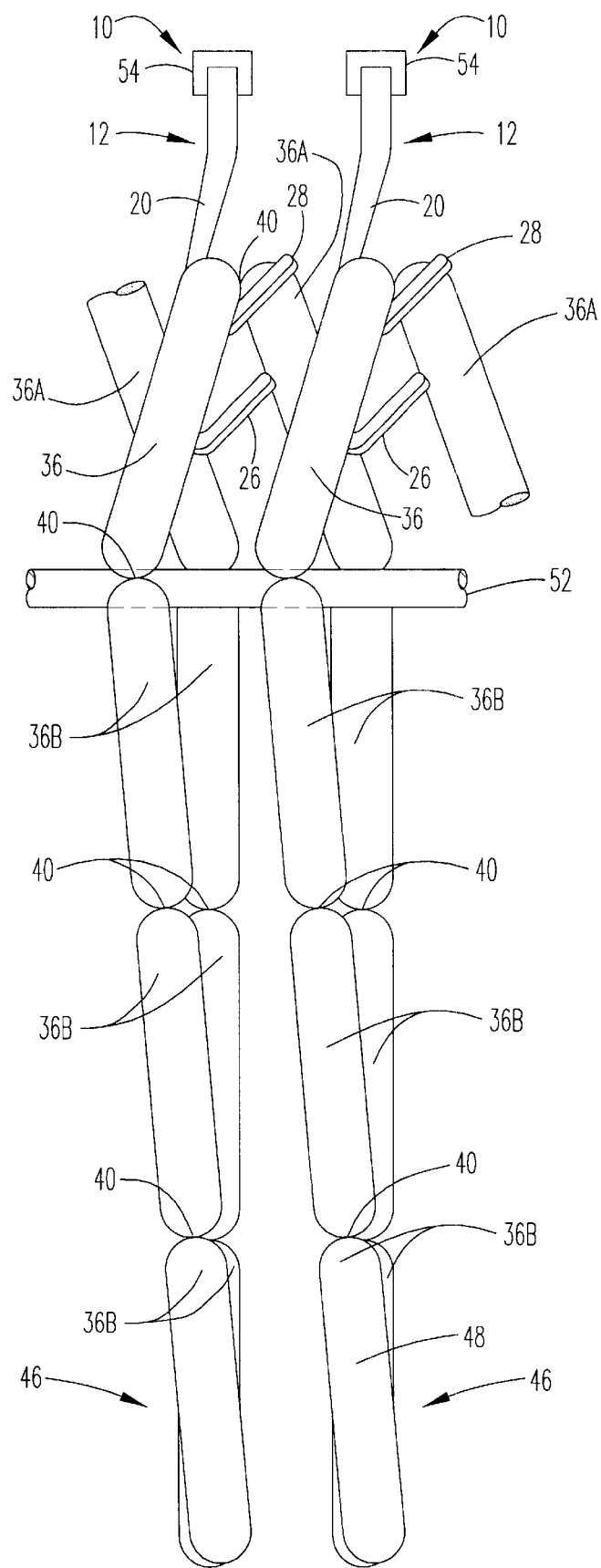
FIG. 8 is a partial side elevational view of hooks loaded with sausage loops.

Their center axes 34 and 34A are parallel. The two aligned cradles 30 and 30A in cooperation with bend points 32 and 32A, respectively serve to support a sausage link 36 of sausage strand 38 wherein a link point 40 is draped over hook element 28 as shown in FIG. 8. The next adjacent link 36A extends downwardly and away from link 36 in the same vertical plane 42 (FIG. 9) to create an inverted V-shaped opening 44 as the links 36 and 36A are spread away from each other to create the spread V-shaped opening 44 in sausage strand loop 46, comprised of links 36, 36A and 36B. A plurality of loops 46 are formed in sausage strand 48. The numeral 36 in FIGS. 7 and 8 identifies the link in each loop that is supported by the hook elements 26 and 28.

Figure 9:
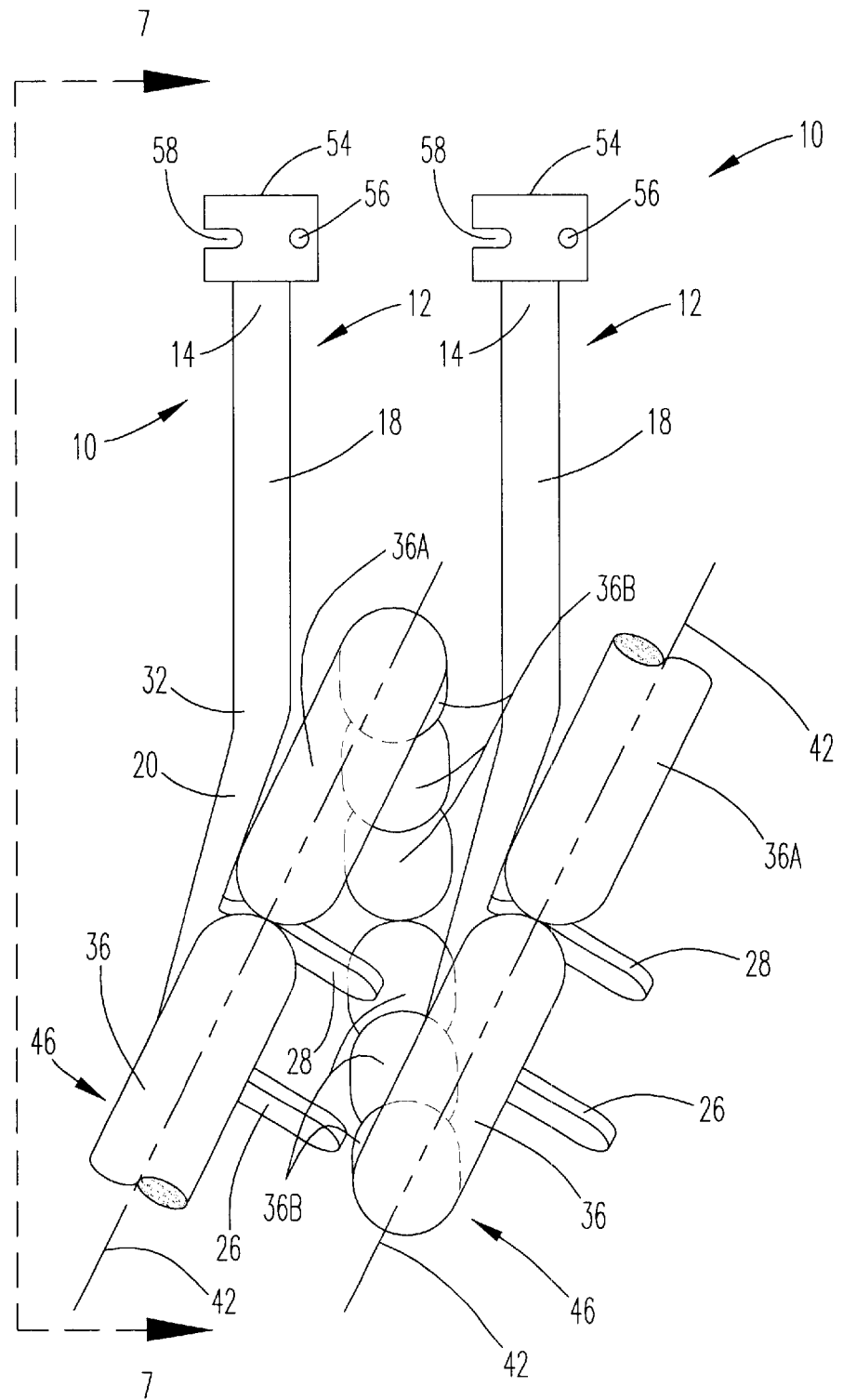
FIG. 9 is a partial plan view of the elements shown in FIG. 8.

As seen in FIG. 9, the plane 42 of the loop 46 are in a diagonal position with respect to the direction of travel of the conveyor chain 48 of conveyor 50 to facilitate the ending of stick 52 into the loops through opening 44. The hooks 10 are connected to the conveyor chain 48 by fitting 54 (FIGS. 1–4) on the inner end (14) of each of the support arms 12. (FIGS. 3 and 4.) The connector portion 54 has an aperture 52 and a notch 54 to facilitate connection to the conventional conveyor chain 48 (FIG. 10) of conveyor 50. Conveyor chain 48 is mounted on conveyor 50 and the chain is operated by any convenient source of power (not shown). The linked sausage strand 48 passes longitudinally through discharge horn 60 and is picked up by the endmost hook 10 as the conveyor chain 48 and the hooks 10 move in a counterclockwise direction (FIG. 10) as indicated by the arrow 62.

It is therefore seen that this invention will achieve at least all of its stated objectives.

What is claimed is:

1. A sausage conveyor hook for use with a sausage strand having an alternating pattern of link points and sausage links, comprising:

an elongated support arm portions disposed at an angle with respect to each other, the first arm portion normally being in a horizontal position and the second arm portion extending downwardly and outwardly from the first arm portion, a first and second spaced hook element secured to the second arm portion, wherein the first spaced hook element is adapted to engage and support one link point of the sausage strand, and the second spaced hook element is adapted to engage and directly support an adjacent sausage link, wherein said sausage link is directly connected to said link point, such that the sausage strand is disposed to create a V-shaped opening about the first spaced hook element.

2. The hook element of claim 1 wherein the hook elements are positioned on the second arm portion such that the center axes of adjacent sausage links draped across the hook element in the upper position will be in substantially the same vertical plane.

3. The hook of claim 1 wherein the plane in which the sausage links would dwell is diagonally disposed with respect to a forward edge of the support arm.

4. The hook of claim 1 wherein means are provided on a first end of the support arm to connect the hook to a conveyor chain.

5. The hook of claim 1 wherein the second arm has a length greater than that of the first arm.

6. The hook element of claim 1 wherein the spaced hook elements being of identical size, shape, and configuration, the hook elements having substantially parallel elongated axes disposed at an angle to an elongated axis of the second arm portion, the hook elements being located in an outer terminal end of the second arm portion and at a center portion of the second arm portion and are located on a forward side of the lower arm portion and extend away therefrom in a forwardly direction, and the hook elements being substantially parallel in upper and lower positions, with each having a cradle so that an elongated sausage link of a sausage strand having a plurality of sausage links can support the elongated sausage link on the cradles in a sloping position when the elongated sausage link has a link point at an upper end pivotally connected to an adjacent sausage link when the sausage strand is draped over the hook element in the upper position and the link point is situated at the cradle of the hook element in the upper position, wherein the elongated sausage link supported on the hook elements will be disposed in an angular position with respect to the adjacent sausage link.

\* \* \* \* \*